United States Patent
Itsui

(10) Patent No.: US 11,842,152 B2
(45) Date of Patent: Dec. 12, 2023

(54) SENTENCE STRUCTURE VECTORIZATION DEVICE, SENTENCE STRUCTURE VECTORIZATION METHOD, AND STORAGE MEDIUM STORING SENTENCE STRUCTURE VECTORIZATION PROGRAM

(71) Applicant: Mitsubishi Electric Corporation, Tokyo (JP)

(72) Inventor: Hiroyasu Itsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 328 days.

(21) Appl. No.: 17/378,543

(22) Filed: Jul. 16, 2021

(65) Prior Publication Data
US 2021/0342534 A1  Nov. 4, 2021

Related U.S. Application Data

(63) Continuation of application No. PCT/JP2019/003302, filed on Jan. 31, 2019.

(51) Int. Cl.
| | |
|---|---|
| G06F 40/268 | (2020.01) |
| G06F 40/205 | (2020.01) |
| G06F 40/279 | (2020.01) |
| G06F 16/35 | (2019.01) |
| G06F 16/33 | (2019.01) |

(52) U.S. Cl.
CPC ........ *G06F 40/268* (2020.01); *G06F 16/3347* (2019.01); *G06F 16/353* (2019.01); *G06F 40/205* (2020.01); *G06F 40/279* (2020.01)

(58) Field of Classification Search
CPC .. G06F 40/268; G06F 16/3347; G06F 16/353; G06F 40/205; G06F 40/279

USPC ........................................ 704/222, 231, 251
See application file for complete search history.

(56) References Cited

U.S. PATENT DOCUMENTS

2003/0172352 A1  9/2003  Kashima et al.

FOREIGN PATENT DOCUMENTS

| | | |
|---|---|---|
| JP | 2002-14970 A | 1/2002 |
| JP | 2003-271599 A | 9/2003 |
| JP | 2012-203472 A | 10/2012 |
| JP | 2018-136760 A | 8/2018 |

OTHER PUBLICATIONS

De Marneffe et al., "Stanford typed dependencies manual", Revised for the Stanford Parser v.3.7.0, Sep. 2016, total 28 pages.
Schuster et al., "Enhanced English Universal Dependencies: an Improved Representation for Natural Language Understanding Tasks", LREC Stanford University, ID 779, 2016, total 8 pages.

*Primary Examiner* — George C Monikang
(74) *Attorney, Agent, or Firm* — Birch, Stewart, Kolasch & Birch, LLP

(57) ABSTRACT

A sentence structure vectorization device includes processing circuitry to generate a plurality of morphemes by performing morphological analysis on an input sentence; to generate a dependence structure graph regarding the plurality of morphemes by performing dependency parsing on the plurality of morphemes; and to generate a sentence structure vector by extracting a plurality of pieces of partial structure information from the dependence structure graph and converting a morpheme string corresponding to the plurality of pieces of partial structure information into a numerical sequence.

9 Claims, 10 Drawing Sheets

The boy who lived — 200

| MORPHEME NUMBER | MORPHEME |
|---|---|
| 1 | the |
| 2 | boy |
| 3 | who |
| 4 | lived |

RESULT OF MORPHOLOGICAL ANALYSIS

| MORPHEME NUMBER | MORPHEME | DEPENDENCY NUMBER | DEPENDENCY RELATIONSHIP |
|---|---|---|---|
| 1 | the | 2 | det |
| 2 | boy | 4 | nsubj |
| 3 | who | 2 | ref |
| 4 | lived | 2 | acl:relcl |

RESULT OF DEPENDENCY PARSING

RESULT OF DEPENDENCY PARSING

FIG. 9

| N-GRAM NUMBER (N=1) | MORPHEME INFORMATION 1 | MORPHEME INFORMATION 2 | MORPHEME INFORMATION 3 |
|---|---|---|---|
| 1 | boy. nsubj | - | - |
| 2 | lived. acl:relcl | - | - |
| 3 | the. det | - | - |
| 4 | who. ref | - | - |

1-MORPHEME STRUCTURE INFORMATION

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | 2 | 1 | the | 2 | det |
| 2 | * | 2 | boy | 4 | nsubj |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | * | 2 | boy | 4 | nsubj |
| 2 | 1 | 3 | who | 2 | ref |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | 2 | 2 | boy | 4 | nsubj |
| 2 | * | 4 | lived | 2 | acl:relcl |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | * | 2 | boy | 4 | nsubj |
| 2 | 1 | 4 | lived | 2 | acl:relcl |

FIG.11

| N-GRAM NUMBER (N=2) | MORPHEME INFORMATION 1 | MORPHEME INFORMATION 2 | MORPHEME INFORMATION 3 |
|---|---|---|---|
| 1 | boy. nsubj | - | - |
| 2 | lived. acl:relcl | - | - |
| 3 | the. det | - | - |
| 4 | who. ref | - | - |
| 5 | boy. nsubj | lived. acl:relcl | - |
| 6 | boy. nsubj | who. ref | - |
| 7 | the. det | boy. nsubj | - |

2-MORPHEME STRUCTURE INFORMATION

FIG.12

| 2-MORPHEME STRUCTURE NUMBER | RENUMBERING DEPENDENCY NUMBER 1 | RENUMBERING DEPENDENCY NUMBER 2 |
|---|---|---|
| 0 | 2 | * |
| 1 | * | 1 |

2-MORPHEME STRUCTURE INFORMATION

FIG.13A
INFORMATION GENERATED BY MERGING

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | 2 | 1 | the | 2 | det |
| 2 | * | 2 | boy | 4 | nsubj |
| 3 | 2 | 3 | who | 2 | ref |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | 2 | 1 | the | 2 | det |
| 2 | 3 | 2 | boy | 4 | nsubj |
| 3 | * | 4 | lived | 2 | acl:relcl |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | 2 | 1 | the | 2 | det |
| 2 | * | 2 | boy | 4 | nsubj |
| 3 | 2 | 4 | lived | 2 | acl:relcl |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | 3 | 2 | boy | 4 | nsubj |
| 2 | 1 | 3 | who | 2 | ref |
| 3 | * | 4 | lived | 2 | acl:relcl |

| RENUMBERING MORPHEME NUMBER | RENUMBERING DEPENDENCY NUMBER | MORPHEME NUMBER | MORPHEME | DEPENDENCY NUMBER | DEPENDENCY RELATIONSHIP |
|---|---|---|---|---|---|
| 1 | * | 2 | boy | 4 | nsubj |
| 2 | 1 | 3 | who | 2 | ref |
| 3 | 1 | 4 | lived | 2 | acl:relcl |

| N-GRAM NUMBER (N=3) | MORPHEME INFORMATION 1 | MORPHEME INFORMATION 2 | MORPHEME INFORMATION 3 |
|---|---|---|---|
| 1 | boy. nsubj | - | - |
| 2 | lived. acl:relcl | - | - |
| 3 | the. det | - | - |
| 4 | who. ref | - | - |
| 5 | boy. nsubj | lived. acl:relcl | - |
| 6 | boy. nsubj | who. ref | - |
| 7 | the. det | boy. nsubj | - |
| 8 | boy. nsubj | who. ref | lived. acl:relcl |
| 9 | the. det | boy. nsubj | who. ref |
| 10 | the. det | boy. nsubj | lived. acl:relcl |

3-MORPHEME STRUCTURE

FIG.15

| 3-MORPHEME STRUCTURE NUMBER | RENUMBERING DEPENDENCY NUMBER 1 | RENUMBERING DEPENDENCY NUMBER 2 | RENUMBERING DEPENDENCY NUMBER 3 |
|---|---|---|---|
| 0 | 2 | 3 | * |
| 1 | 2 | * | 1 |
| 2 | 2 | * | 2 |
| 3 | * | 3 | 1 |
| 4 | 3 | 1 | * |
| 5 | 3 | 3 | * |
| 6 | 3 | * | 2 |
| 7 | * | 1 | 1 |
| 8 | * | 1 | 2 |

3-MORPHEME STRUCTURE

FIG.16

1-MORPHEME STRUCTURE INFORMATION

| DIMENSION | 1 | 2 | 3 | 4 |
|---|---|---|---|---|
| MORPHEME STRING | boy.nsubj<br>—<br>— | lived.acl:relcl<br>—<br>— | the.det<br>—<br>— | who.ref<br>—<br>— |
| N-GRAM NUMBER | 1 | 2 | 3 | 4 |
| PARTIAL GRAPH | ○ | ○ | ○ | ○ |
| MORPHEME STRUCTURE NUMBER | 0 | 0 | 0 | 0 |
| $V_k$ | 1 | 1 | 1 | 1 |

2-MORPHEME STRUCTURE INFORMATION

| DIMENSION | 5 | 6 | 7 | 8 |
|---|---|---|---|---|
| MORPHEME STRING | boy.nsubj<br>lived.acl:relcl<br>— | boy.nsubj<br>lived.acl:relcl<br>— | boy.nsubj<br>who.ref<br>— | boy.nsubj<br>the.det<br>— |
| N-GRAM NUMBER | 5 | 5 | 6 | 7 |
| PARTIAL GRAPH | ○→○ | ○←○ | ○↔○ | ○↔○ |
| MORPHEME STRUCTURE NUMBER | 0 | 1 | 1 | 0 |
| $V_k$ | 1 | 1 | 1 | 1 |

3-MORPHEME STRUCTURE INFORMATION

| DIMENSION | 9 | 10 | 11 | 12 | 13 |
|---|---|---|---|---|---|
| MORPHEME STRING | boy.nsubj<br>who.ref<br>lived.acl:relcl | boy.nsubj<br>who.ref<br>lived.acl:relcl | the.det<br>boy.nsubj<br>who.ref | the.det<br>boy.nsubj<br>lived.acl:relcl | the.det<br>boy.nsubj<br>lived.acl:relcl |
| N-GRAM NUMBER | 8 | 8 | 9 | 10 | 10 |
| PARTIAL GRAPH | ○↔○↔○ | ○↔○↔○ | ○↔○↔○ | ○↔○↔○ | ○↔○↔○ |
| MORPHEME STRUCTURE NUMBER | 4 | 7 | 2 | 0 | 2 |
| $V_k$ | 1 | 1 | 1 | 1 | 1 |

400

SENTENCE STRUCTURE VECTORIZATION DEVICE, SENTENCE STRUCTURE VECTORIZATION METHOD, AND STORAGE MEDIUM STORING SENTENCE STRUCTURE VECTORIZATION PROGRAM

CROSS-REFERENCE TO RELATED APPLICATION

This application is a continuation application of International Application No. PCT/JP2019/003302 having an international filing date of Jan. 31, 2019, the disclosure of which is incorporated herein by reference in its entirety.

BACKGROUND OF THE INVENTION

1. Field of the Invention

The present invention relates to a sentence structure vectorization device, a sentence structure vectorization method and a sentence structure vectorization program.

2. Description of the Related Art

With the prevalence of World Wide Web, a great number of e-texts (hereinafter referred to also as "texts") described in natural languages are being accumulated. Accordingly, the importance of full-text search technology for searching accumulated texts for a desired text, document classification technology for classifying accumulated texts according to the contents of the description, etc. is increasing. For example, in the full-text search technology, ranking (i.e., order) of retrieval object texts is determined based on the degree of similarity of contents between an inputted query text (i.e., question sentence text) and each retrieval object text. In the document classification technology, each text is classified under one of a plurality of classes based on the degree of similarity of contents between texts.

There has been known a technology of extracting a feature value called a "concept vector" from a text in order to determine the degree of similarity of contents between texts, that is, the degree of similarity of the meaning between sentences included in texts. For example, Patent Reference 1 proposes a system that performs morphological analysis on a text, extracts content words (i.e., terms) while also generating an index formed on the basis of terms, handles each term as a term vector that is weighted according to an importance level in the text, and represents a feature value of each text by a vector obtained by combining the term vectors. In the retrieval, the degree of similarity between the query text and each retrieval object text is calculated by using a search query vector obtained by combining the weighted term vectors. The degree of similarity is, for example, the cosine of an angle formed by two vectors, namely, the cosine similarity. However, since this method forms the vectors by using each individual term obtained by the morphological analysis, there is a problem in that even texts different from each other in the meaning are determined to have a high degree of similarity if the texts are the same as each other in the set of content words (Bag-of-Words: BoW).

To resolve this problem, Patent Reference 2 proposes a method that converts the structure of a text into a labeled ordered tree (i.e., dependence structure tree) by performing dependency parsing on the structure of the text and vectorizes partial structures of the dependence structure tree as feature values. However, it has recently been known that semantic structure of a sentence such as parallel structure cannot be sufficiently expressed by a dependence structure tree.

To resolve this problem, Non-patent Reference 1 proposes a method for expressing the semantic structure of a sentence by using a dependency graph structure (dependency graph).

Patent Reference 1: Japanese Patent Application Publication No. 2002-14970

Patent Reference 2: Japanese Patent Application Publication No. 2003-271599

Non-patent Reference 1: Sebastian Schuster and another, "Enhanced English Universal Dependencies: An Improved Representation for Natural Language Understanding Tasks", LREC Stanford University, ID 779, 2016

Non-patent Reference 2: Marie-Catherine de Marneffe and another, "Stanford typed dependencies manual", Revised for the Stanford Parser v.3.7.0, September 2016

However, in a case where partial graphs as partial structures of the dependency graph structure is extracted from the dependency graph structure, there is a problem in that the number of calculations necessary for the vectorization of the text structure increases since the number of the extracted partial graphs increases exponentially with the increase in the size of the dependency graph structure.

SUMMARY OF THE INVENTION

An object of the present invention, which has been made to resolve the above-described problem, is to provide a sentence structure vectorization device, a sentence structure vectorization method and a sentence structure vectorization program that make it possible to appropriately vectorize sentence structure with a small number of calculations.

A sentence structure vectorization device according to an aspect of the present invention includes processing circuitry to generate a plurality of morphemes by performing morphological analysis on an input sentence; to generate a dependence structure graph regarding the plurality of morphemes by performing dependency parsing on the plurality of morphemes; and to generate a sentence structure vector by extracting a plurality of pieces of partial structure information from the dependence structure graph and converting a morpheme string corresponding to the plurality of pieces of partial structure information into a numerical sequence made up of a plurality of vector values, wherein each of the plurality of vector values is the number of appearances of a morpheme structure number in each of a plurality of dimensions corresponding to the plurality of pieces of partial structure information, the morpheme structure number is obtained based on morpheme structure information associating a dependency relationship between N morphemes where N is greater than or equal to 1, and a plurality of morpheme structure numbers, and the number of the appearances is 1 in a case where the morpheme structure number in each of the plurality of dimensions exists in the morpheme structure information, and the number of the appearances is 0 or information on the number of the appearances is omitted in a case where the morpheme structure number in each of the plurality of dimensions does not exist in the morpheme structure information.

A sentence structure vectorization method according to another aspect of the present invention includes generating a plurality of morphemes by performing morphological analysis on an input sentence; generating a dependence structure graph regarding the plurality of morphemes by performing dependency parsing on the plurality of morphemes; and generating a sentence structure vector by extracting a plurality of pieces of partial structure information from the dependence structure graph and converting a morpheme string corresponding to the plurality of pieces of partial structure information into a numerical sequence made up of a plurality of vector values, wherein each of the plurality of vector values is the number of appearances of a morpheme structure number in each of a plurality of dimensions corresponding to the plurality of pieces of partial structure information, the morpheme structure number is obtained based on morpheme structure information associating a dependency relationship between N morphemes where N is greater than or equal to 1, and a plurality of morpheme structure numbers, and the number of the appearances is 1 in a case where the morpheme structure number in each of the plurality of dimensions exists in the morpheme structure information, and the number of the appearances is 0 or information on the number of the appearances is omitted in a case where the morpheme structure number in each of the plurality of dimensions does not exist in the morpheme structure information.

According to the present invention, the sentence structure can be appropriately vectorized with a small number of calculations.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a diagram showing morpheme information having N-gram numbers 1 to 4 stored in a memory;

FIGS. 10A to 10D are diagrams showing information generated by assigning renumbering morpheme numbers and renumbering dependency numbers to extracted information regarding two morphemes;

FIG. 11 is a diagram showing morpheme information with N-gram numbers 1 to 7 stored in the memory;

FIG. 12 is a diagram showing a correspondence relationship between a 2-morpheme structure number and renumbering dependency numbers used for a process when a partial graph is made up of two morphemes;

FIGS. 13A to 13E are diagrams showing information generated by merging a plurality of pieces of information extracted from information shown in FIGS. 10A to 10D;

FIG. 14 is a diagram showing morpheme information with N-gram numbers 1 to 10 stored in the memory;

FIG. 15 is a diagram showing a correspondence relationship between a 3-morpheme structure number and renumbering dependency numbers used for a process when the partial graph is made up of three morphemes;

FIG. 16 is a diagram showing an example of information regarding the sentence structure vectorization extracted from the information shown in FIG. 9 to FIG. 15.

DETAILED DESCRIPTION OF THE INVENTION

Figure 1:
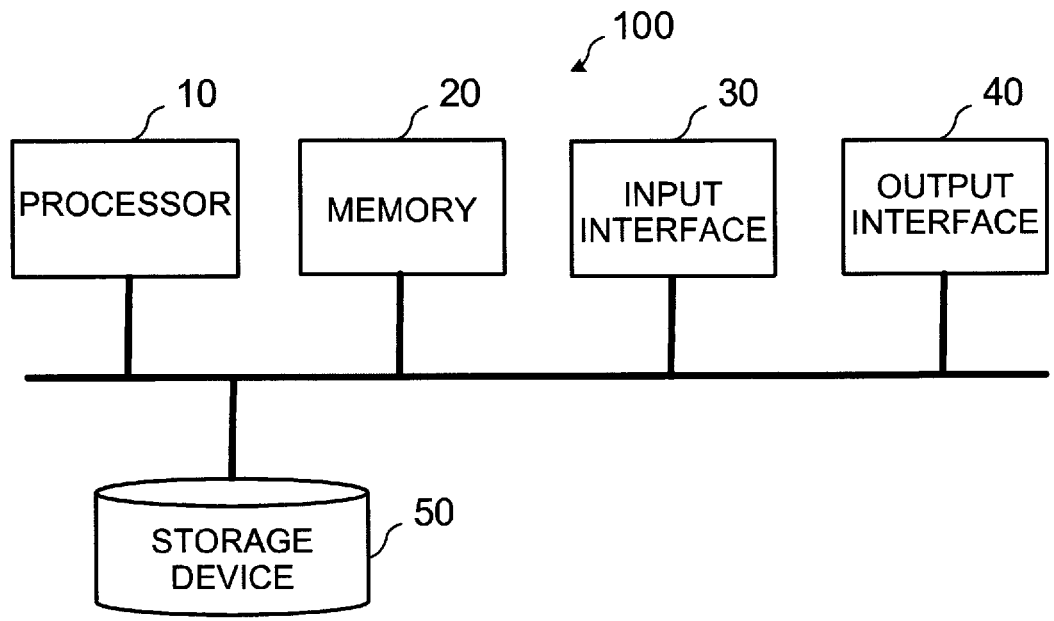
FIG. 1 is a diagram showing an example of a hardware configuration of a sentence structure vectorization device according to a first embodiment of the present invention.

A sentence structure vectorization device, a sentence structure vectorization method and a sentence structure vectorization program according to each embodiment of the present invention will be described below with reference to the drawings. In the drawings, components identical with each other are assigned the same reference character. The following embodiments are just examples and a variety of modifications are possible within the scope of the present invention. For example, configurations of embodiments can be appropriately combined together. In this application, terminology described in Non-patent References 1 and 2 is used.

First Embodiment

First, the configuration of a sentence structure vectorization device 100 according to a first embodiment of the present invention will be described below. FIG. 1 is a diagram showing an example of a hardware configuration of the sentence structure vectorization device 100 according to the first embodiment. In the example shown in FIG. 1, the sentence structure vectorization device 100 includes, for example, a memory 20 that stores a program as software, namely, a sentence structure vectorization program, and a processor 10 as an arithmetic processing unit that executes the program stored in the memory 20. The processor 10 is processing circuitry (i.e., an information processing circuit) such as a CPU (Central Processing Unit). The memory 20 is a volatile storage device such as a RAM (Random Access Memory), for example. The sentence structure vectorization device 100 is a computer, for example.

The sentence structure vectorization program according to the first embodiment is stored in the memory 20 from a record medium (i.e., a non-transitory computer-readable storage medium) recording information via a medium information reading device (not shown), or via a communication interface (not shown) connectable to the Internet or the like. The sentence structure vectorization program according to the first embodiment can be executed by the processor 10. A sentence structure vectorization method according to the first embodiment can be implemented by the processor 10 executing the sentence structure vectorization program stored in the memory 20.

The sentence structure vectorization device 100 may include an input interface 30 to which an input device as a user operation unit such as a mouse, a keyboard or a touch panel is connected. Further, the sentence structure vectorization device 100 may include an output interface 40 to which a display device for displaying images is connected. Furthermore, the sentence structure vectorization device 100 may include a storage device 50 (i.e., an auxiliary storage) for storing various types of information such as an HDD (Hard Disk Drive) or an SSD (Solid State Drive). The storage device 50 can be an external storage device of the sentence structure vectorization device 100. In cases where the sentence structure vectorization device 100 includes a communication interface (not shown) for communicating with an external device, the storage device 50 can be a storage device existing in the cloud connectable via the communication interface.

Figure 2:
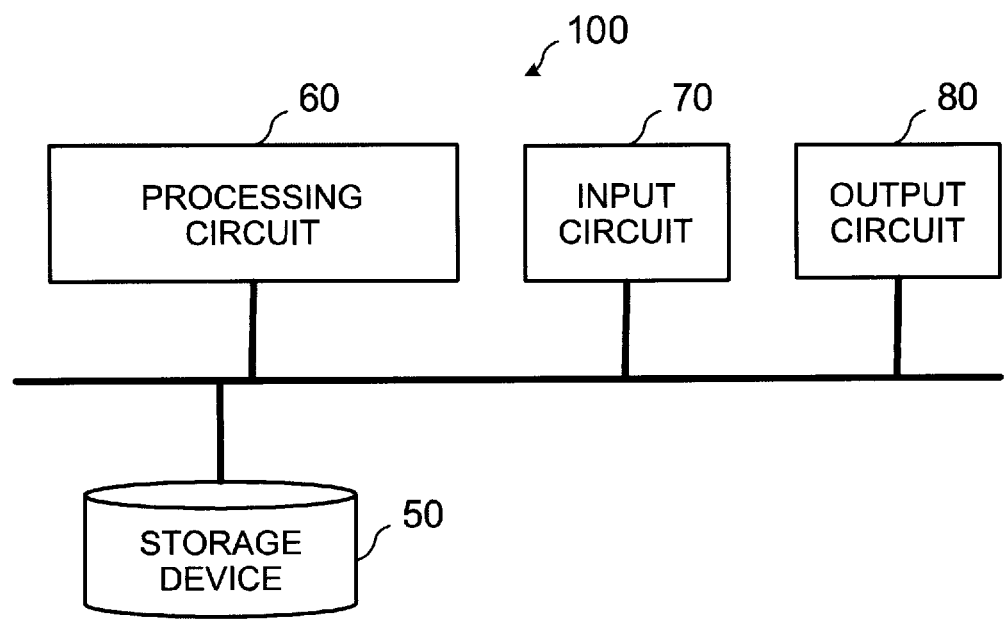
FIG. 2 is a diagram showing another example of the hardware configuration of the sentence structure vectorization device according to the first embodiment.

FIG. 2 is a diagram showing another example of the hardware configuration of the sentence structure vectorization device 100 according to the first embodiment. In the example shown in FIG. 2, the sentence structure vectorization device 100 includes processing circuitry. The processing circuitry includes a processing circuit 60, an input circuit 70 having an input interface, an output circuit 80 having an output interface, and a storage device 50. The processing circuit 60 is dedicated hardware, for example. The processing circuit 60 may include a processor that implements a function of each unit by reading in and executing a program stored in a memory. It is also possible to implement a part of the processing circuit 60 by dedicated hardware and implement another part of the processing circuit 60 by a circuit including a processor that executes software or firmware.

Figure 3:
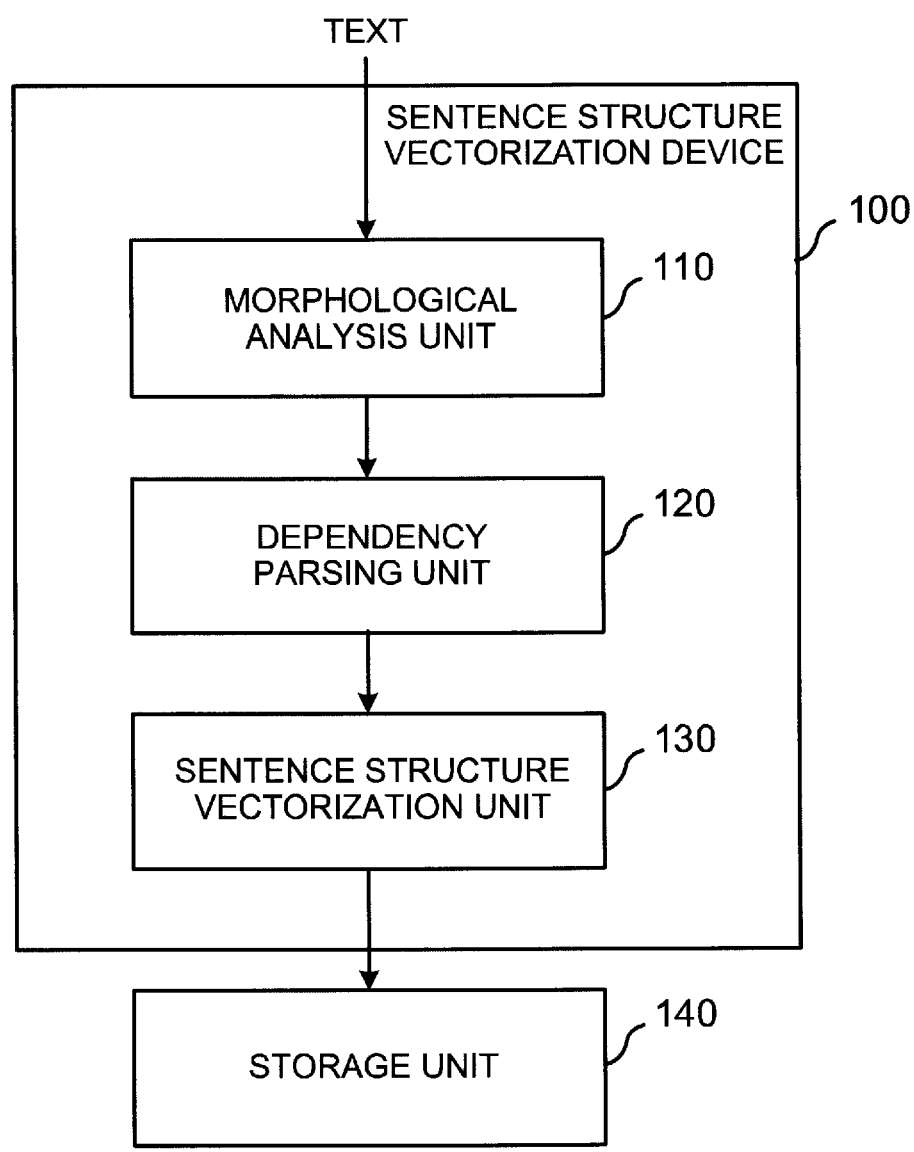
FIG. 3 is a functional block diagram schematically showing a configuration of the sentence structure vectorization device according to the first embodiment.

FIG. 3 is a functional block diagram schematically showing a configuration of the sentence structure vectorization device 100 according to the first embodiment. As shown in FIG. 3, the sentence structure vectorization device 100 includes a morphological analysis unit 110, a dependency parsing unit 120 and a sentence structure vectorization unit 130. Further, the sentence structure vectorization device 100 may include a storage unit 140 that stores a sentence structure vector that has been generated. The storage unit 140 can be, for example, the memory 20, the storage device 50, or both of the memory 20 and the storage device 50 in FIG. 1 or FIG. 2.

Figures 4, 5:
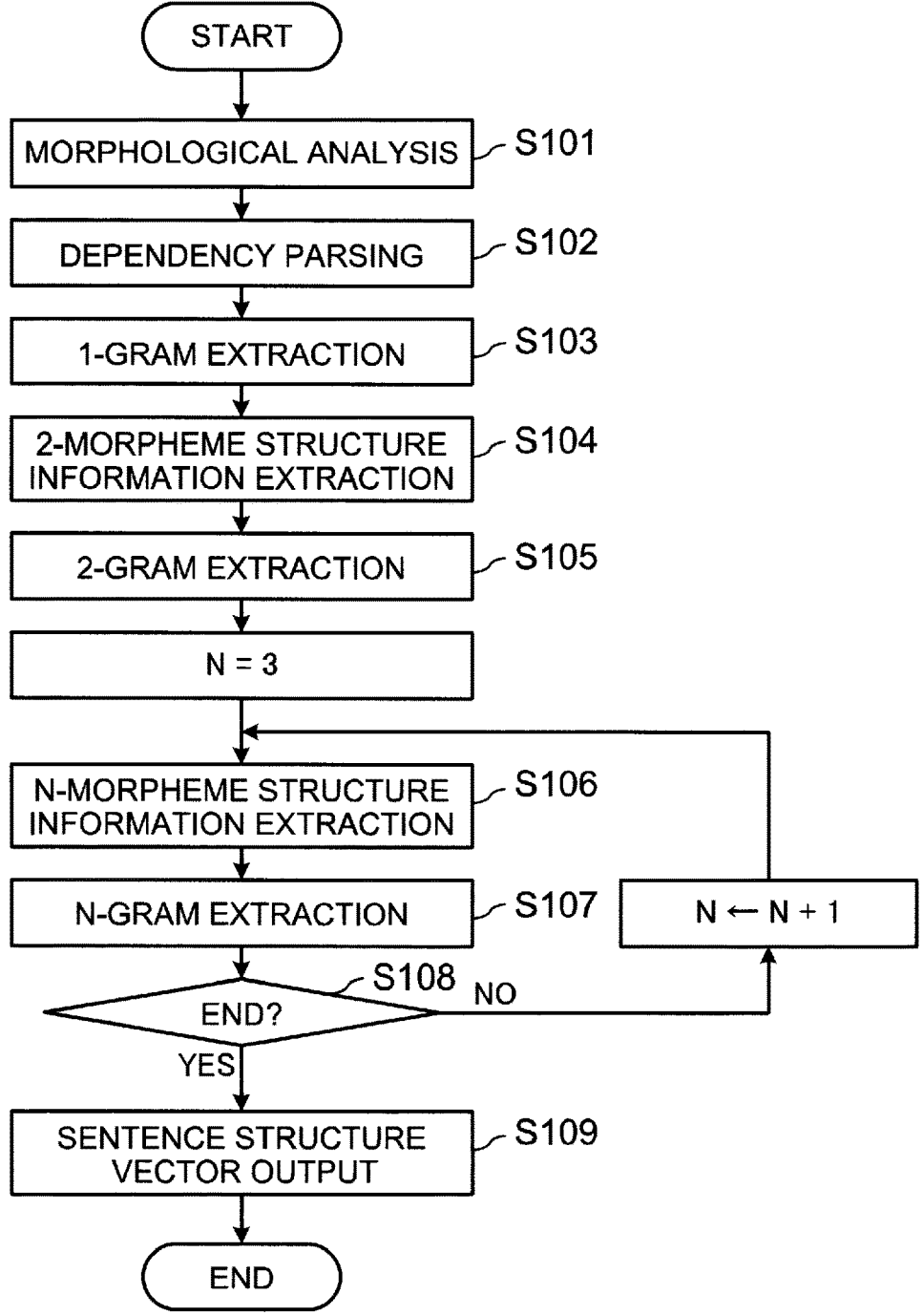
FIG. 4 is a flowchart showing an operation of the sentence structure vectorization device according to the first embodiment.
FIG. 5 is a diagram showing an example of an input sentence that is inputted to the sentence structure vectorization device according to the first embodiment.
Figures 6, 7, 8:
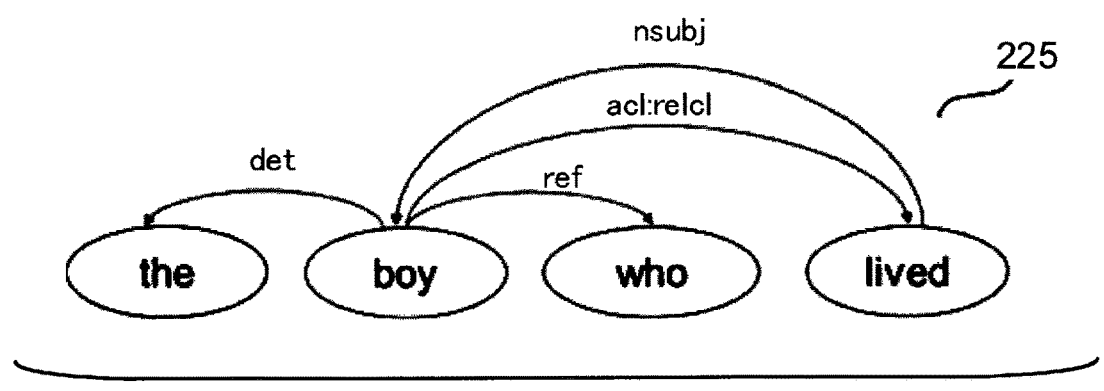
FIG. 6 is a diagram showing an example of a result of morphological analysis performed by a morphological analysis unit of the sentence structure vectorization device according to the first embodiment.
FIG. 7 is a diagram showing an example of a result of dependency parsing performed by a dependency parsing unit of the sentence structure vectorization device according to the first embodiment.
FIG. 8 is a diagram showing the dependency parsing result of FIG. 7 in a graph structure.

The morphological analysis unit 110 receives a query text as a text including a plurality of input sentences and segments each of the plurality of input sentences by means of morphological analysis. This process is referred to also as morphological segmentation. The morphological analysis unit 110 outputs a plurality of morphemes as the result of the morphological analysis. The "morpheme" is the minimum unit of an expressive element having a meaning. A process for performing the morphological segmentation can be carried out by using a publicly known technology. An example of the input sentence is shown in FIG. 5 which will be explained later. Examples of the morpheme are shown in FIG. 6 which will be explained later.

The dependency parsing unit 120 analyzes dependency, namely, a dependence structure, in a plurality of morphemes regarding each input sentence outputted from the morphological analysis unit 110. The dependency parsing unit 120 outputs dependence structure information as the result of the analysis of the dependence structure. The "dependence structure" indicates a syntax structure of a sentence, and expresses the structure of a morpheme string made up of a plurality of morphemes by using a set of dependence relationships between morphemes in the sentence. The dependence relationship between morphemes is referred to also as a dependency relationship between morphemes. A process for performing the dependency parsing can be carried out by using a publicly known technology. An example of the dependence structure is shown in FIG. 7 which will be explained later.

The sentence structure vectorization unit 130 receives the dependence structure information regarding each input sentence outputted from the dependency parsing unit 120 and generates a sentence structure vector corresponding to the dependence structure.

Next, an operation of the sentence structure vectorization device 100 according to the first embodiment will be described below. FIG. 4 is a flowchart showing the operation of the sentence structure vectorization device 100 according to the first embodiment. FIG. 5 is a diagram showing an example of the input sentence received by the sentence structure vectorization device 100. This input sentence example "The boy who lived" is quoted from examples shown in the left-hand column on page 4 of the Non-patent Reference 1.

(Step S101: Morphological Analysis)

In step S101, when the input sentence 200 shown in FIG. 5 is inputted to the morphological analysis unit 110, the morphological analysis unit 110 performs the morphological analysis on the input sentence 200, namely, a text, and outputs the result of the morphological analysis.

FIG. 6 is a diagram showing an example of the result of the morphological analysis performed by the morphological analysis unit 110. Four morphemes are shown in FIG. 6. In the morphological analysis result 210 shown in FIG. 6, examples of the morpheme are shown in the second column from the left, and morpheme numbers assigned to the morphemes shown in the second column are shown in the first column from the left. In FIG. 6, the second column is shown in surface forms (i.e., lowercase-unified character strings).

(Step S102: Dependency Parsing)

In the next step S102, when the morphological analysis result 210 shown in FIG. 6 is inputted to the dependency parsing unit 120, the dependency parsing unit 120 performs the dependency parsing on the morphological analysis result 210.

FIG. 7 is a diagram showing an example of the result of the dependency parsing performed by the dependency parsing unit 120. Information in the first column and the second column in FIG. 7 is the same as the information in the first column and the second column in FIG. 6. In FIG. 7, the third column shows dependency numbers and the fourth column shows the dependency relationships. Here, the "dependency number" represents the morpheme number of a keyword (head) in the dependency. The "dependency relationship" is a label. The dependency number and the dependency relationship are explained in the Non-patent Reference 2, for example.

In FIG. 7, the dependency relationship "det" represents a determiner, and the dependency relationship "nsubj" represents a nominal subject. The dependency relationship "ref" represents a referent. The character string "acl" represents a clausal modifier of a noun. The character string "relcl" represents a relative clause. The dependency relationship "acl:relcl" represents a relative clause modifier of a noun.

FIG. 8 is a diagram showing the dependency parsing result of FIG. 7 in a graph structure. This graph structure is referred to also as a "dependency structure" or a "dependence structure graph". In FIG. 8, "lived" modifies "boy" as "nsubj", and "boy" modifies "lived" as "acl:relcl". In other words, "boy" and "lived" modify each other and form a loop structure in the graph structure 255. Therefore, the dependency structure shown in FIG. 8 cannot be processed appropriately by the conventional tree structure incapable of expressing a loop structure.

(Step S103: 1-Gram Extraction)

FIG. 9 is a diagram showing information obtained by sorting morpheme information 1, as information on the pairs each consisting of a morpheme and a dependency relationship shown in FIG. 7, in the order of characters. Here, the order of characters is the alphabetical order. The sentence structure vectorization unit 130 sorts the morpheme information 1, as the information on the pairs each consisting of a morpheme and a dependency relationship, in the order of characters, and assigns N-gram numbers to the morpheme information 1. N is a positive integer. The N-gram numbers are assigned originating from 1 (i.e., starting the count from 1) in ascending order as shown in FIG. 9. FIG. 9 shows a case where N=1, that is, a case of 1-gram. The 1-gram means a unigram. The information shown in FIG. 9 is stored in a memory (e.g., the memory 20 or the storage device 50 in FIG. 1). For example, the morpheme information "boy.nsubj" is morpheme information formed by the pair consisting of the morpheme "boy" and the dependency relationship "nsubj". By the above-described process, information 300 with the N-gram numbers 1 to 4 shown in FIG. 9 is stored in the memory.

(Step S104: Two-Morpheme Structure Information Extraction)

FIGS. 10A to 10D are diagrams showing information generated by assigning renumbering morpheme numbers and renumbering dependency numbers to extracted information regarding two morphemes. The sentence structure vectorization unit 130 executes a process of extracting information regarding two morphemes in a dependency relationship from the morphemes in the input sentence. This process is executed for every morpheme in the input sentence. Here, a description will be given of a case where this process is executed for the morphemes with the morpheme numbers 1 to 4 shown in FIG. 7.

In FIG. 7, the dependency number of the morpheme "the" with the morpheme number 1 is "2". Thus, as indicated as information 230 in FIG. 10A, the sentence structure vectorization unit 130 extracts two pieces of information regarding the morpheme "the" with the morpheme number 1 and the morpheme "boy" with the morpheme number 2 in a dependency relationship and assigns the renumbering morpheme numbers, as serial numbers starting from 1, to the extracted two pieces of information.

The renumbering morpheme numbers are shown in the first column of FIG. 10A. As shown in FIG. 10A, the sentence structure vectorization unit 130 stores information that is the same as the information with the morpheme number 1 and the information with the morpheme number 2 in the information 220 shown in FIG. 7 in the memory as the morpheme numbers, the morphemes, the dependency numbers and the dependency relationships.

The renumbering dependency numbers are shown in the second column of FIG. 10A. Since the dependency number regarding "the" with the morpheme number 1 in FIG. 7 is "2", the sentence structure vectorization unit 130 refers to the renumbering morpheme number of "boy" with the morpheme number 2. Since this renumbering morpheme number is "2", the sentence structure vectorization unit 130 stores the same numerical value "2" in the memory as the renumbering dependency number.

Further, since the dependency number regarding "boy" with the morpheme number 2 in FIG. 7 is "4", the sentence structure vectorization unit 130 searches for the morpheme number 4. However, the morpheme number 4 does not exist in the information 230 shown in FIG. 10A, and thus the sentence structure vectorization unit 130 stores "*", as a symbol meaning that there exists no modified, in the memory as the renumbering dependency number of "boy" with the morpheme number 2.

The sentence structure vectorization unit 130 executes a process similar to the above-described process for each of the morphemes with the morpheme numbers 2 to 4 shown in FIG. 7, thereby generates information 240, 250 and 260 shown in FIGS. 10B to 10D, and stores the generated information 240, 250 and 260 in the memory.

(Step S105: 2-Gram Extraction)

FIG. 11 is a diagram showing information generated by the sentence structure vectorization unit 130 from the information shown in FIGS. 10A to 10D. The sentence structure vectorization unit 130 stores information, obtained by extracting morpheme information as information on a pair consisting of a morpheme and a dependency relationship in regard to each of the two morphemes from each of the information 230, 240, 250 and 260 shown in FIGS. 10A to 10D and sorting the extracted pieces of morpheme information in the order of characters, in the memory in addition to the information stored when the N-gram numbers are 1-gram numbers. FIG. 11 shows a case where N=2, that is, a case of 2-gram. The 2-gram means a bigram.

In the first embodiment, information with the N-gram numbers 1 to 4 has already been stored in the memory as shown in FIG. 9 when the N-gram numbers are 1-gram numbers. Therefore, when the N-gram numbers are 2-gram numbers, the sentence structure vectorization unit 130 stores information with the N-gram numbers 5 and greater in the memory. In a manner similar to the case where the N-gram numbers are 1-gram numbers, the sentence structure vectorization unit 130 stores the information on the morpheme and the dependency relationship with the renumbering morpheme number 1 in the column of the morpheme information 1, and stores the information on the morpheme and the dependency relationship with the renumbering morpheme number 2 in a column of morpheme information 2. As shown in FIG. 11, the sentence structure vectorization unit 130 stores the information with the N-gram numbers 5, 6 and 7 in the memory. By the above-described process, information 310 with the N-gram numbers 1 to 7 shown in FIG. 11 is stored in the memory.

(Step S106: N-Morpheme Structure Information Extraction)

Subsequently, the sentence structure vectorization unit 130 performs the process by setting the number of morphemes as processing targets at N. For example, let N represent an integer greater than or equal to 3, a plurality pieces of partial structure information include structure information from 1-morpheme structure information regarding one morpheme to N-morpheme structure information regarding N morphemes, and the sentence structure vectorization unit 130 generates the N-morpheme structure information by performing a process of merging (N−1)-morpheme structure information and 2-morpheme structure information together.

In the first embodiment, a case of executing the process up to N=3 will be described for the sake of simplicity. In order to process N morphemes, morpheme structure information on N−1 morphemes (i.e., (N−1)-morpheme structure information) and morpheme structure information on two morphemes (i.e., 2-morpheme structure information) are used. Since three pieces of morpheme structure information are generated in this example, (N−1)-morpheme structure information (i.e., 2-morpheme structure information) and 2-morpheme structure information are used. The sentence structure vectorization unit 130 executes the following process for every piece of (N−1 (=2))-morpheme structure information in FIGS. 10A to 10D.

FIGS. 13A to 13E are diagrams showing information generated by merging a plurality of pieces of information extracted from the information shown in FIGS. 10A to 10D. The sentence structure vectorization unit 130 executes the process by focusing on the morpheme number 1 and the morpheme number 2 in the information 230 in FIG. 10A. The sentence structure vectorization unit 130 makes a search to determine whether or not there exists information on another 2-morpheme structure that can be a partner of combination with the information 230 shown in FIG. 10A. In the information 230 shown in FIG. 10A and the information 240 shown in FIG. 10B, there exist the morpheme numbers 1 and 3 as different morpheme numbers, there exists the morpheme number 2 as a common morpheme number, and the renumbering dependency number regarding the morpheme number 2 is "*". Therefore, these pieces of information 230 and 240 are combinable, that is, mergeable. Accordingly, the sentence structure vectorization unit 130 generates information 270 shown in FIG. 13A by merging the lines having the renumbering morpheme number 2 and stores the morpheme structure information regarding three morphemes (i.e., 3-morpheme structure information) in the memory. Here, to "merge" means to integrate a plurality of pieces of information into one piece of information according to a predetermined rule.

Similarly, in the information 230 shown in FIG. 10A and the information 250 shown in FIG. 10C, there exist the morpheme numbers 1 and 4 as different morpheme numbers, and there exists the morpheme number 2 as a common morpheme number. However, the renumbering dependency number regarding the morpheme number 2 shown in FIG. 10A is "*", whereas the renumbering dependency number regarding the morpheme number 2 shown in FIG. 10C is "2". Therefore, the sentence structure vectorization unit 130 merges the lines having the morpheme number 2. In this case, since the dependency number regarding the renumbering dependency number 2 for making the combination is "4" as shown in FIG. 10C, the sentence structure vectorization unit 130 generates information 280 shown in FIG. 13B by performing the merging by employing "3", which is the renumbering morpheme number of the information 250 shown in FIG. 10C after the merging, as the renumbering dependency number. This information 280 is additionally stored in the memory as 3-morpheme structure information. By repeating the same process, 3-morpheme structure information shown in FIGS. 13C to 13E is generated.

(Step S107: N-Gram Extraction)

FIG. 14 is a diagram showing information generated by the sentence structure vectorization unit 130 from information on N pairs. FIG. 14 shows a case where N=3, that is, a case of 3-gram. The 3-gram means a trigram. In FIG. 14, the information on N pairs is the morpheme information 1 to 3. The sentence structure vectorization unit 130 assigns N-gram numbers to information obtained by performing the sorting in the order of characters and stores the information in the memory in addition to the information stored in the case of (N−1)-gram. Subsequently, the sentence structure vectorization unit 130 stores information, obtained by assigning the N-gram numbers to the information obtained by sorting the information on the N pairs each consisting of a morpheme and a dependency relationship shown in FIGS. 13A to 13E in the order of characters, in the memory in addition to the information shown in FIG. 11.

In the first embodiment, information with the N-gram numbers 1 to 7 has already been stored in the memory as shown in FIG. 14 when the N-gram numbers are 2-gram numbers. Therefore, the sentence structure vectorization unit 130 stores information with the N-gram numbers "8" and greater in the memory. Namely, the sentence structure vectorization unit 130 stores the information with the N-gram numbers 8 to 10 shown in FIG. 14, which is stored when the N-gram numbers are 3-gram numbers, in the memory in addition to the information with the N-gram numbers 1 to 4 shown in FIG. 9 which is stored when the N-gram numbers are 1-gram numbers and the information with the N-gram numbers 5 to 7 shown in FIG. 11 which is stored when the N-gram numbers are 2-gram numbers. Specifically, the sentence structure vectorization unit 130 stores information on a morpheme and a dependency relationship with the renumbering morpheme number 1 in FIGS. 13A to 13E in the column of the morpheme information 1, stores information on a morpheme and a dependency relationship with the renumbering morpheme number 2 in FIGS. 13A to 13E in the column of the morpheme information 2, and stores information on a morpheme and a dependency relationship with the renumbering morpheme number 3 in FIGS. 13A to 13E in the column of the morpheme information 3. By the above-described process, information 320 with the N-gram numbers 1 to 10 shown in FIG. 14 is stored in the memory.

(Step S108: End Judgment)

In the next step S108, the sentence structure vectorization unit 130 judges whether the process for every sentence has ended or not. If the process for every sentence has been completed, the judgment is YES and the process advances to step S109. If the process has not been completed, the judgment is NO, the number N is incremented by 1, and the process returns to the step S106.

(Step S109: Sentence Structure Vector Output)

FIG. 16 is a diagram showing an example of information regarding the sentence structure vectorization extracted from the information shown in FIG. 9 to FIG. 15. FIG. 16 shows vector values Vk corresponding to vector dimensions extracted by the sentence structure vectorization unit 130. The sentence structure vectorization unit 130 outputs a numerical sequence made up of the vector values Vk as the sentence structure vector.

In the step S109, the sentence structure vectorization unit 130 extracts the sentence structure vector from the morpheme structure information.

In the dimensions 1 to 4 in FIG. 16, vector values Vk when a partial graph as a partial structure extracted from the dependence structure graph is made up of one morpheme are shown. The morpheme information with the N-gram numbers 1 to 4 forms a morpheme string and is stored in the memory. The morpheme structure numbers at that time (i.e., 1-morpheme structure numbers) are all "0" as shown in FIG. 16 according to a calculation of N−1=1−1=0 based on one morpheme and one type of morpheme.

Next, in the dimensions 5 to 8 in FIG. 16, vector values Vk when the partial graph as a partial structure extracted from the dependence structure graph is made up of two morphemes are shown. The morpheme information with the N-gram numbers 5 to 7 forms a morpheme string and is stored in the memory. Since the morpheme structure with the N-gram number 5 is two pieces of information: the information 250 in FIG. 10C and the information 260 in FIG. 10D, morpheme structure numbers (in this case, 2-morpheme structure numbers) are obtained from information 285 shown in FIG. 12, and "0" and "1" as the respective morpheme numbers are recorded. Thereafter, for the dimensions 6, 7 and 8, processes similar to the process in the case of the dimension 5 are executed. Incidentally, FIG. 12 is a diagram showing a correspondence relationship between the 2-morpheme structure number and renumbering dependency numbers used for a process when the partial graph is made up of two morphemes.

Next, in the dimensions 9 to 13 in FIG. 16, vector values Vk when the partial graph as a partial structure extracted from the dependence structure graph is made up of three morphemes are shown. The morpheme information with the N-gram numbers 8 to 10 forms a morpheme string and is stored in the memory. Since the morpheme structure with the N-gram number 8 is two pieces of information: the information 300 in FIG. 13D and the information 310 in FIG. 13E, morpheme structure numbers (in this case, 3-morpheme structure numbers) are obtained from information 315 shown in FIG. 15, and "4" and "7" as the respective morpheme numbers are recorded. Thereafter, for the dimensions 10, 11, 12 and 13, processes similar to the process in the case of the dimension 9 are executed. Incidentally, FIG. 15 is a diagram showing a correspondence relationship between the 3-morpheme structure number and renumbering dependency numbers used for a process when the partial graph is made up of three morphemes.

In the first embodiment, the number of morpheme structure numbers appearing in each of the dimensions shown in FIG. 16 is all 1, and thus the vector values Vk all become 1. The sentence structure vectorization unit 130 outputs a vector having the resultant Vk values corresponding to the dimension numbers as the sentence structure vector. The outputted sentence structure vector is stored in the storage unit 140.

As described above, with the sentence structure vectorization device 100, the sentence structure vectorization method or the sentence structure vectorization program according to the first embodiment, the dependence structure graph as the result of the dependency can be expanded into partial structures suitable for language restrictions of a natural language. For example, it is possible to extract partial graphs as partial structures from the dependence structure graph while excluding dependency that cannot exist in reality and generate the sentence structure vector by using such partial graphs. Accordingly, an appropriate sentence structure vector according to the meaning of the sentence can be generated.

Further, in the first embodiment, the number of combinations of morpheme structures that should be processed can be reduced by the process of gradually merging morpheme structures. Furthermore, by determinately extracting partial structures without searching for looped graph structures, the sentence structure vector can be generated with a small number of calculations.

Incidentally, the above description has been given of a case where there exist one or more partial structures appearing in the input sentence, in which the amount of information is reduced by omitting 0 as the vector value Vk representing a case where no partial structure exists. Accordingly, storage capacity required of the memory can be reduced. However, the sentence structure vector that is outputted can also be a vector including the vector value 0 representing a case where no partial structure exists.

Further, while the above description has been given of a case where the input sentence inputted to the sentence structure vectorization device 100 is an English sentence, the input sentence can also be a sentence in a backward dependency language such as Japanese or Korean. In the case of processing a backward dependency language, the sentence structure vectorization device 100 may reduce the number of calculations and the storage capacity required of the memory by executing a process of deleting morpheme structure numbers that cannot exist in reality.

Second Embodiment

In the above first embodiment, the sentence structure vectorization device 100 that vectorizes the input sentence is described. In a second embodiment, a description will be given of a sentence structure vectorization device 100a that makes it possible to execute document retrieval or document classification by using the sentence structure vector generated by the sentence structure vectorization device 100 according to the above first embodiment. With the sentence structure vectorization device 100a, it is possible to execute highly accurate document retrieval or document classification that could not be discriminated in the past.

Figure 17:
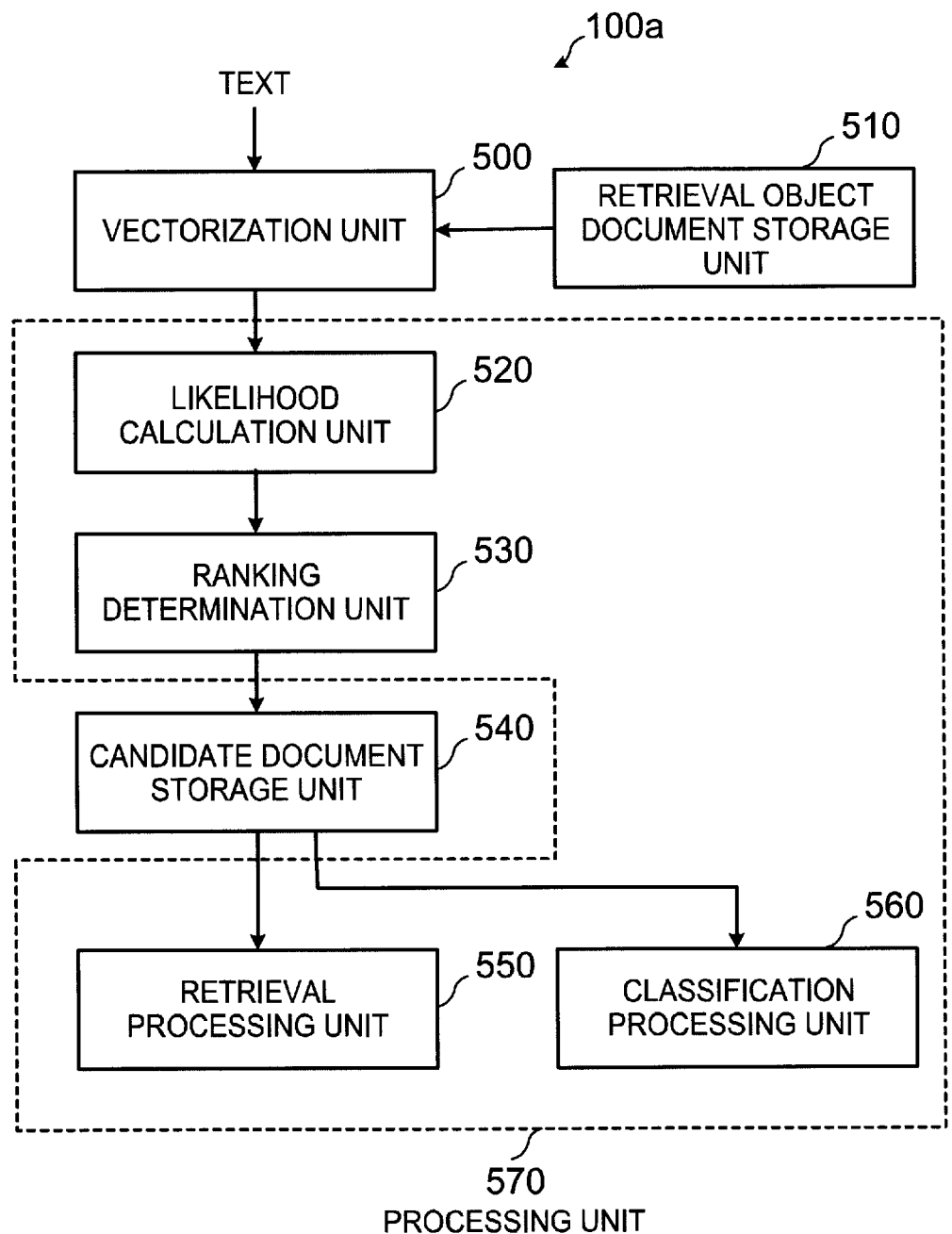
FIG. 17 is a functional block diagram schematically showing a configuration of a sentence structure vectorization device according to a second embodiment of the present invention.

FIG. 17 is a functional block diagram schematically showing a configuration of the sentence structure vectorization device 100a according to the second embodiment of the present invention. The sentence structure vectorization device 100a, a sentence structure vectorization method and a sentence structure vectorization program according to the second embodiment can be implemented by a hardware configuration similar to the hardware configuration shown in FIG. 1 or FIG. 2. The sentence structure vectorization device 100a according to the second embodiment can be implemented by modifying the program executed by the sentence structure vectorization device 100 according to the first embodiment.

As shown in FIG. 17, the sentence structure vectorization device 100a includes a vectorization unit 500, a likelihood calculation unit 520 and a ranking determination unit 530. The vectorization unit 500 is the sentence structure vectorization device 100 according to the first embodiment. The sentence structure vectorization device 100a may include a retrieval object document storage unit 510 that stores retrieval object documents and a candidate document storage unit 540 that stores candidate documents. Further, the sentence structure vectorization device 100a may include a retrieval processing unit 550 that executes a sentence retrieval process, a classification processing unit 560 that executes a sentence classification process, or both of the retrieval processing unit 550 and the classification processing unit 560. In the case where the sentence structure vectorization device 100a includes the retrieval processing unit 550 the sentence structure vectorization device 100a is a document retrieval device. In the case where the sentence structure vectorization device 100a includes the classification processing unit 560 the sentence structure vectorization device 100a is a document classification device. In FIG. 17, the likelihood calculation unit 520, the ranking determination unit 530, the retrieval processing unit 550 and the classification processing unit 560 constitute a processing unit 570 that executes a process based on the sentence structure vector.

The vectorization unit 500 executes a process of vectorizing a query text as a text including an input sentence and texts of the retrieval object documents stored in the retrieval object document storage unit 510 by using a vector space model. For example, the vectorization unit 500 generates weighted vectors regarding terms included in each text, that is, each of the query text and the texts of the retrieval object documents, according to an importance level of tfidf or the like in each text. Here, "tfidf" is an abbreviation of Term Frequency-Inverse Document Frequency (appearance frequency, inverse document frequency). The tfidf is a publicly known method of evaluating the importance level of a term included in the text of a document. The vectorization unit 500 obtains the sentence structure vector as the vector of each text by combining the weighted vectors regarding the terms included in the text.

Subsequently, the likelihood calculation unit 520 calculates the likelihood of the query text and the text of each retrieval object document by using the cosine of an angle formed by the obtained two vectors, namely, the cosine similarity.

Subsequently, the ranking determination unit 530 outputs candidate documents obtained by ranking the retrieval object documents in descending order of the likelihood based on the likelihood calculated by the likelihood calculation unit 520, to the candidate document storage unit 540.

The retrieval processing unit 550 is capable of retrieving a desired document from the retrieval object documents by using the likelihood obtained based on the sentence structure vectors.

The classification processing unit 560 is capable of classifying sentences included in the retrieval object documents into a plurality of classes by using the likelihood obtained based on the sentence structure vectors.

With the sentence structure vectorization device 100*a* described above, highly accurate document retrieval or document classification can be realized.

DESCRIPTION OF REFERENCE CHARACTERS

100, 100*a*: sentence structure vectorization device, 110: morphological analysis unit, 120: dependency parsing unit, 130: sentence structure vectorization unit, 140: storage unit, 500: vectorization unit, 510: retrieval object document storage unit, 520: likelihood calculation unit, 530: ranking determination unit, 540: candidate document storage unit, 550: retrieval processing unit, 560: classification processing unit, 570: processing unit.

What is claimed is:

1. A sentence structure vectorization device comprising: processing circuitry
  to generate a plurality of morphemes by performing morphological analysis on an input sentence;
  to generate a dependence structure graph regarding the plurality of morphemes by performing dependency parsing on the plurality of morphemes; and
  to generate a sentence structure vector by extracting a plurality of pieces of partial structure information from the dependence structure graph and converting a morpheme string corresponding to the plurality of pieces of partial structure information into a numerical sequence made up of a plurality of vector values, wherein
  each of the plurality of vector values is the number of appearances of a morpheme structure number in each of a plurality of dimensions corresponding to the plurality of pieces of partial structure information,
  the morpheme structure number is obtained based on morpheme structure information associating a dependency relationship between N morphemes where N is greater than or equal to 1, and a plurality of morpheme structure numbers, and
  the number of the appearances is 1 in a case where the morpheme structure number in each of the plurality of dimensions exists in the morpheme structure information, and the number of the appearances is 0 or information on the number of the appearances is omitted in a case where the morpheme structure number in each of the plurality of dimensions does not exist in the morpheme structure information.

2. The sentence structure vectorization device according to claim 1, wherein the processing circuitry
  generates a plurality of pieces of morpheme information each including a pair consisting of a corresponding one of the plurality of morphemes and information indicating a dependency relationship obtained by the dependency parsing, and
  extracts the plurality of pieces of partial structure information from the plurality of pieces of morpheme information.

3. The sentence structure vectorization device according to claim 1, wherein
  when N represents an integer greater than or equal to 3, the plurality of pieces of partial structure information includes structure information from 1-morpheme structure information regarding one morpheme to N-morpheme structure information regarding N morphemes, and
  the processing circuitry generates the N-morpheme structure information by performing a process of merging (N−1)-morpheme structure information and 2-morpheme structure information together.

4. The sentence structure vectorization device according to claim 1, further comprising a storage that stores the sentence structure vector.

5. The sentence structure vectorization device according to claim 1, wherein the processing circuitry executes a process that uses the sentence structure vector.

6. The sentence structure vectorization device according to claim 5, wherein the processing circuitry retrieves a document from retrieval object documents by using the sentence structure vector.

7. The sentence structure vectorization device according to claim 5, wherein the processing circuitry executes classification of retrieval object documents by using the sentence structure vector.

8. A sentence structure vectorization method executed by a computer, the method comprising:
  generating a plurality of morphemes by performing morphological analysis on an input sentence;
  generating a dependence structure graph regarding the plurality of morphemes by performing dependency parsing on the plurality of morphemes; and
  generating a sentence structure vector by extracting a plurality of pieces of partial structure information from the dependence structure graph and converting a morpheme string corresponding to the plurality of pieces of partial structure information into a numerical sequence made up of a plurality of vector values, wherein
  each of the plurality of vector values is the number of appearances of a morpheme structure number in each of a plurality of dimensions corresponding to the plurality of pieces of partial structure information,
  the morpheme structure number is obtained based on morpheme structure information associating a dependency relationship between N morphemes where N is greater than or equal to 1, and a plurality of morpheme structure numbers, and the number of the appearances is 1 in a case where the morpheme structure number in each of the plurality of dimensions exists in the morpheme structure information, and the number of the appearances is 0 or information on the number of the appearances is omitted in a case where the morpheme structure number in each of the plurality of dimensions does not exist in the morpheme structure information.

9. A non-transitory computer-readable storage medium for storing a sentence structure vectorization program that causes a computer to execute generating a plurality of morphemes by performing morphological analysis on an input sentence;

generating a dependence structure graph regarding the plurality of morphemes by performing dependency parsing on the plurality of morphemes; and generating a sentence structure vector by extracting a plurality of pieces of partial structure information from the dependence structure graph and converting a morpheme string corresponding to the plurality of pieces of partial structure information into a numerical sequence made up of a plurality of vector values, wherein each of the plurality of vector values is the number of appearances of a morpheme structure number in each of a plurality of dimensions corresponding to the plurality of pieces of partial structure information, the morpheme structure number is obtained based on morpheme structure information associating a dependency relationship between N morphemes where N is greater than or equal to 1, and a plurality of morpheme structure numbers, and the number of the appearances is 1 in a case where the morpheme structure number in each of the plurality of dimensions exists in the morpheme structure information, and the number of the appearances is 0 or information on the number of the appearances is omitted in a case where the morpheme structure number in each of the plurality of dimensions does not exist in the morpheme structure information.

* * * * *